(12) United States Patent
Yamanaka

(10) Patent No.: US 7,742,694 B2
(45) Date of Patent: Jun. 22, 2010

(54) OPTICAL APPARATUS WITH APERTURE CONTROLLER

(75) Inventor: Tomoaki Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 12/111,360

(22) Filed: Apr. 29, 2008

(65) Prior Publication Data

US 2008/0285967 A1    Nov. 20, 2008

(30) Foreign Application Priority Data

May 15, 2007    (JP)    ............................. 2007-128872

(51) Int. Cl.
*G03B 7/00* (2006.01)
(52) U.S. Cl. ...................... 396/213; 396/218; 396/223
(58) Field of Classification Search ................. 396/213, 396/217, 218, 223, 237
See application file for complete search history.

(56) References Cited

U.S. PATENT DOCUMENTS 5,548,371 A * 8/1996 Kawahara et al. ........... 396/245
5,666,570 A * 9/1997 Ohsawa ....................... 396/147
5,867,737 A * 2/1999 Shiokama .................... 396/237

FOREIGN PATENT DOCUMENTS

JP    6-258682 A    9/1994

* cited by examiner

*Primary Examiner*—Rodney E Fuller
(74) *Attorney, Agent, or Firm*—Canon U.S.A., Inc. I.P. Division

(57) ABSTRACT

An optical apparatus, such as an image pickup apparatus, includes a detector configured to detect whether a manual aperture operation unit is operated by an amount greater than or equal to a predetermined amount during automatic aperture control. When an aperture fixing switch is operated or when the detector detects that the manual aperture operation unit is operated by an amount greater than or equal to the predetermined amount, automatic aperture control is disabled and manual aperture control is enabled.

6 Claims, 9 Drawing Sheets

OPTICAL APPARATUS WITH APERTURE CONTROLLER

BACKGROUND OF THE INVENTION

1. Field of the Invention

The present invention relates to an optical apparatus, such as an image pickup apparatus that enables a photographer to perform manual aperture control, an image pickup apparatus with a replaceable lens, or the like. More particularly, the present invention relates to a switching control method for switching from automatic aperture control to manual aperture control in the case where a manual operation of an aperture unit of the optical apparatus is performed by the photographer when the aperture unit is automatically controlled.

2. Description of the Related Art

Aperture control and focus control of image pickup apparatuses have been made automatic, and even a novice photographer can easily use such an image pickup apparatus. In general, however, automatic aperture control is switchable to manual aperture control such that the photographer can capture images under arbitrary conditions. Switching between automatic and manual aperture control can be performed by changing an image pickup mode or by using a fixing switch.

Selectable image pickup modes include an automatic mode in which all functions are automatically controlled, an audio-visual (AV) mode in which functions other than the aperture control are automatically controlled, and a manual mode in which all the functions are manually controlled. The aperture fixing switch enables the function of forcedly locking an aperture unit by operating the switch in the case where automatic aperture control is performed.

For example, Japanese Patent Laid-Open No. 6-258682 discloses a method of improving the user-friendliness by making a focus control system and an aperture control system common when the photographer manually operates the aperture.

To perform manual aperture control in the case where automatic aperture control is performed, it is necessary to first change from automatic aperture control to manual aperture control by changing the image pickup mode or by pressing the aperture fixing switch and then to change the aperture size by operating an aperture operation ring or an aperture operation dial.

An image pickup operation must be interrupted in order to change the image pickup mode. When the mode is changed to the manual mode by using the aperture fixing switch, an image may be blurred due to an operation of the switch.

SUMMARY OF THE INVENTION

The present invention provides an image pickup apparatus that enables easy switching from automatic aperture control to manual aperture control by operating an aperture operation unit and provides such an image pickup apparatus with a replaceable lens.

A technical feature of an image pickup apparatus according to an aspect of the present invention resides in an operation-amount detector configured to detect whether a manual aperture operation unit is operated by an amount greater than or equal to a predetermined amount during automatic aperture control. In the case where an aperture fixing switch is operated or in the case where the operation-amount detector detects that the manual aperture operation unit is operated by an amount greater than or equal to the predetermined amount, automatic aperture control is disabled, and manual aperture control of an aperture unit is enabled.

According to the image pickup apparatus and the image pickup apparatus with a replaceable lens according to the aspect of the present invention, automatic aperture control can be easily changed to manual aperture control by operating the manual aperture operation unit. Accordingly, the mode can be instantaneously changed to manual aperture control in the case where a photographer intends to perform manual aperture control, such as when there is a sudden change in captured scene that cannot be followed by automatic aperture control. Furthermore, since automatic aperture control can be easily resumed, after the mode has been changed to manual aperture control, by operating a switch or according to a change in the amount of exposure, the image pickup apparatus becomes easier to use.

Further features of the present invention will become apparent from the following description of exemplary embodiments with reference to the attached drawings.

DESCRIPTION OF THE EMBODIMENTS

Various exemplary embodiments, features and aspects of the present invention will now herein be described in detail below with reference to the drawings.

First Exemplary Embodiment

Figure 1:
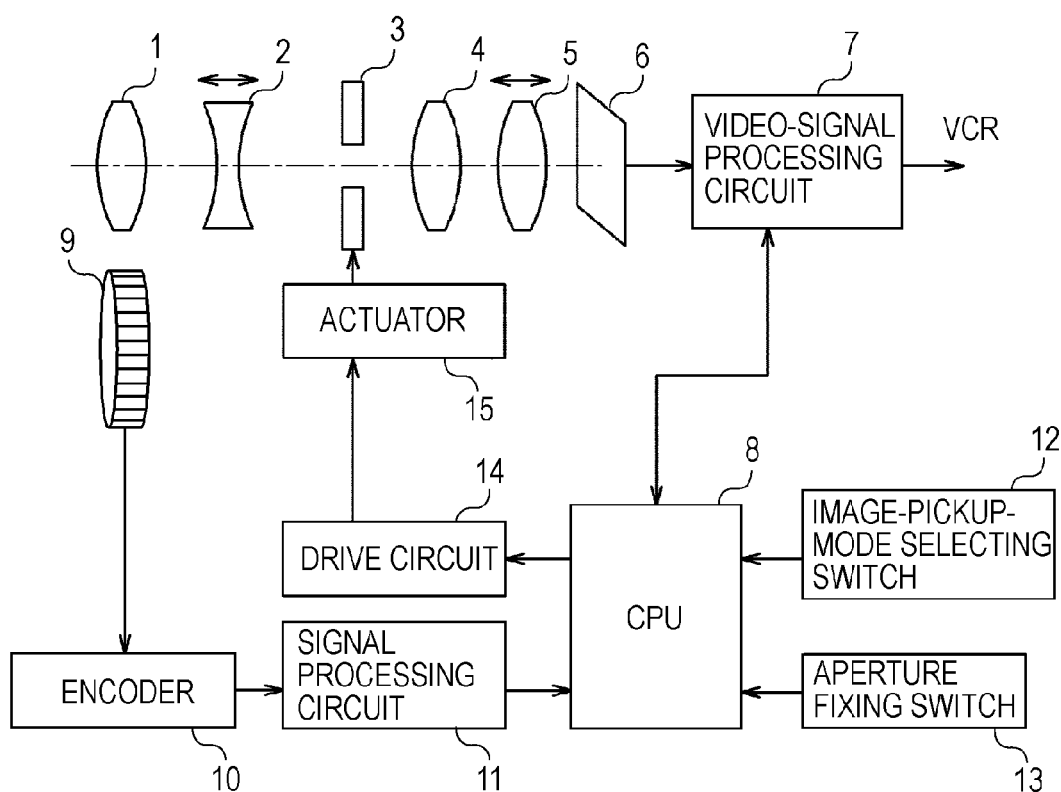
FIG. 1 is a block diagram of an example circuit according to a first embodiment of the present invention.

FIG. 1 is a circuit block diagram of an image pickup apparatus according to a first embodiment. Along the optical axis, a fixed front lens group 1, a movable zoom lens group 2, an aperture 3, a fixed lens group 4, a movable focus lens group 5, and an image pickup element 6 including a charge-coupled device (CCD) sensor or a complementary metal-oxide semiconductor (CMOS) sensor are sequentially arranged.

An output of the image pickup element 6 is connected as a captured image to a central processing unit (CPU) 8 via a video-signal processing circuit 7 and as a video-cassette recorder (VCR) output to an external device or to a display device such as a liquid crystal finder.

An output of an aperture operation ring 9 is connected to the CPU 8 via an encoder 10 and a signal processing circuit 11. An output of an image-pickup-mode selecting switch 12 and an output of an aperture fixing switch 13 are connected to the CPU 8. An output of the CPU 8 is connected via a drive circuit 14 to an actuator 15 including a direct-current (DC) motor, a stepping motor, or the like. The actuator 15 drives the aperture 3.

When an image is picked up, a video signal output from the image pickup element 6 is sent to the video-signal processing circuit 7. The video-signal processing circuit 7 applies predetermined amplification and gamma correction to the video signal, and thereafter the video signal is output to a display device.

The aperture operation ring 9 for manually operating the aperture 3 has a ring shape. Alternatively, the aperture operation ring 9 may have a button shape or a dial shape.

When the aperture operation ring 9 is operated, a signal corresponding to the amount the aperture operation ring 9 is operated is output from the encoder 10, converted by the signal processing circuit 11, and input to the CPU 8. The signal processing circuit 11 is a processing circuit such as an amplifier or a level conversion circuit. The signal processing circuit 11 generates an analog value or a pulse output in proportion to the amount the aperture operation ring 9 is operated and converts the generated output into a signal that can be read by the CPU 8. The CPU 8 obtains exposure-amount information from the video-signal processing circuit 7 and sends a drive signal to the drive circuit 14 so that the aperture 3 can have a desired aperture size. The drive circuit 14 drives the actuator 15, and, as a result, the aperture 3 is driven.

The image-pickup-mode selecting switch 12 is operated by a photographer to change the image pickup mode to, for example, an automatic mode, an AV mode, a manual mode, and the like. In the case where automatic aperture control is performed, if the aperture fixing switch 13 is operated, the aperture size is forcedly fixed. Thereafter, when the operator operates the aperture operation ring 9, the aperture size can be changed.

Figure 2:
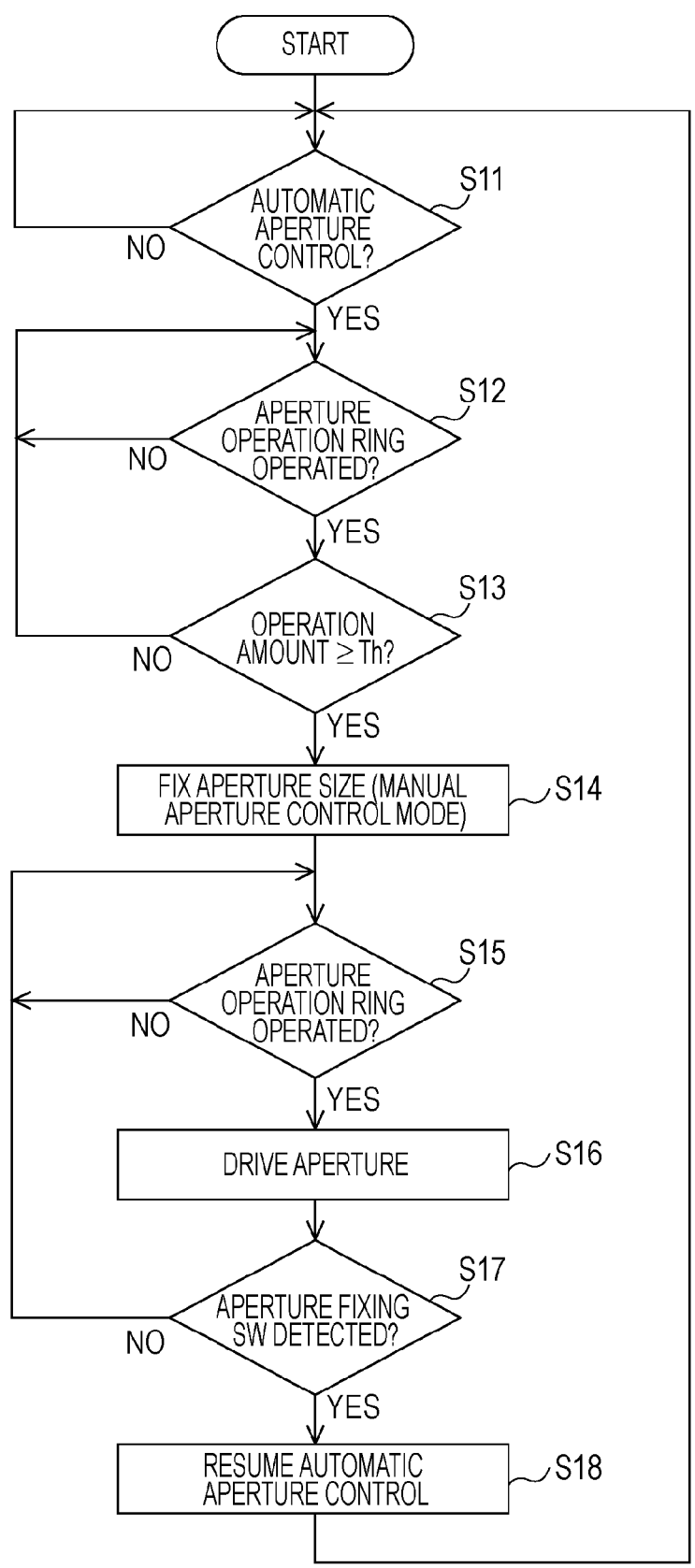
FIG. 2 is a flowchart of an example operation.

FIG. 2 is a flowchart of an aperture operation.

In step S11, it is determined whether aperture control is automatic aperture control or not. For example, when the image pickup mode is the automatic mode, all functions are automatically controlled. Thus, the aperture 3 is automatically controlled, and the flow proceeds to step S12. When the image pickup mode is the manual mode, all the functions are manually controlled.

In step S12, the flow waits for the aperture operation ring 9 to be operated. When the aperture operation ring 9 is operated, the flow proceeds to step S13.

Step S13 is performed to avoid a detection mistake in the case where the aperture operation ring 9 is operated by mistake during automatic aperture control. In step S13, it is determined whether the aperture operation ring 9 is operated by an amount greater than or equal to a predetermined amount. More specifically, when the aperture operation ring 9 is operated by an amount greater than or equal to a threshold Th, it is determined that the photographer has an intention to operate the aperture operation ring 9, and the flow proceeds to step S14.

Figure 3:
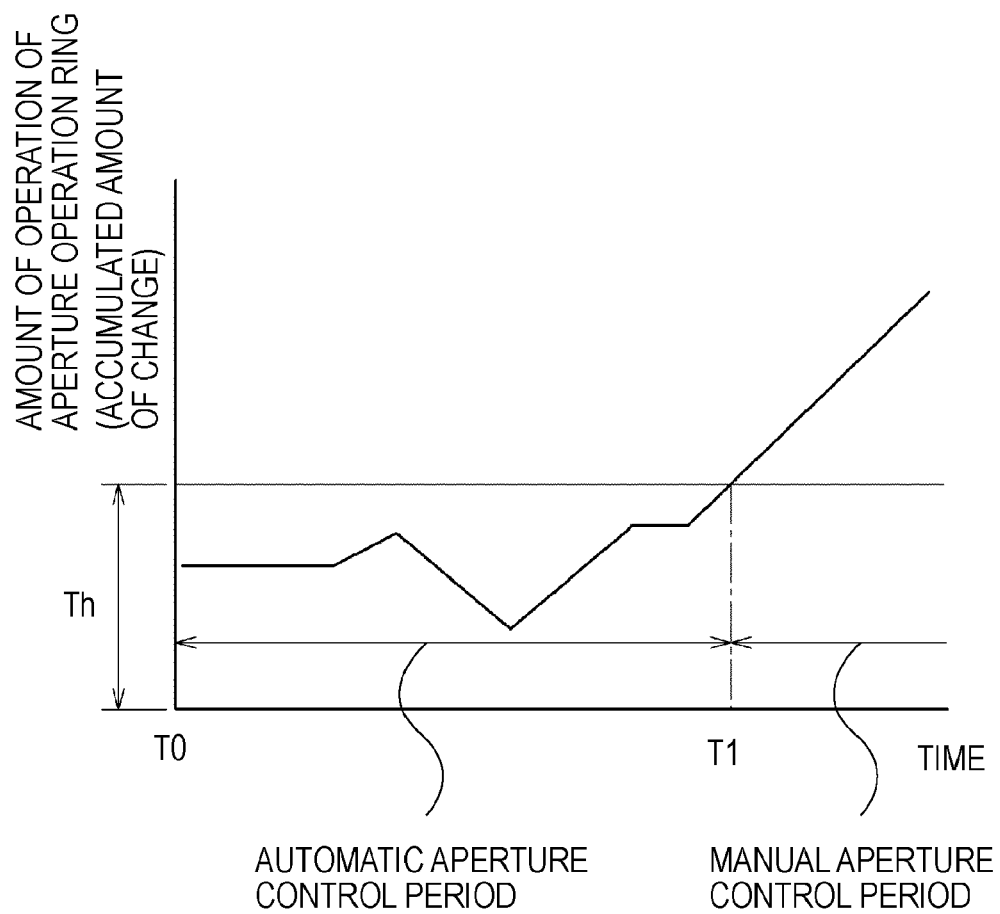
FIG. 3 is a graph illustrating the amount an aperture operation ring is operated.

FIG. 3 illustrates a condition for changing from automatic aperture control to manual aperture control. In FIG. 3, time is plotted in abscissa, and an accumulated amount of change in the amount the aperture operation ring 9 is operated is plotted in ordinate. For example, when the aperture operation ring 9 is operated clockwise toward an object to be photographed, the amount operated is accumulated as a positive amount in ordinate; when the aperture operation ring 9 is operated counterclockwise, the amount operated is accumulated as a negative amount in ordinate.

In period from time T0 to time T1, the accumulated amount of change in the amount the aperture operation ring 9 is operated (that is, the angle of rotation) is less than the predetermined threshold Th. Thus, the CPU 8 performs automatic aperture control. From time T1 onward, the accumulated amount of change greater than or equal to the threshold Th is detected, and hence, automatic aperture control is changed to manual aperture control. The angle of rotation from the opened aperture to the closed aperture is generally 50 to 60 degrees. The appropriate threshold Th is 2 to 3 degrees.

In step S14, automatic aperture control is changed to manual aperture control, and the aperture size is fixed. The aperture size to be fixed is preferably the aperture size that has been set at the end of automatic aperture control in order to avoid an extreme change in the amount of exposure. To fix the aperture size, the CPU 8 causes the drive circuit 14 to output a drive signal to drive the actuator 15.

In step S15, it is determined whether the aperture operation ring 9 is operated again. When the operation of the aperture operation ring 9 is detected, the flow proceeds to step S16.

In step S16, the aperture 3 is driven based on the amount the aperture operation ring 9 is operated. Whether the aperture 3 is driven so that the aperture 3 is closed down or opened up is determined by the direction of rotation of the aperture operation ring 9.

In step S17, whether the aperture fixing switch 13 is operated or not is determined. When the aperture fixing switch 13 is not operated, the flow returns to step S15, and manual aperture control is continued. When the aperture fixing switch 13 is operated, the flow proceeds to step S18.

In step S18, automatic aperture control is resumed. As is clear from the flowchart shown in FIG. 2, the aperture fixing switch 13 serves both as a normal switch for fixing the aperture size and an operation switch for cancelling the fixing of the aperture, that is, for resuming automatic aperture control.

The CPU 8 performs the foregoing processing. Accordingly, the photographer can easily change automatic aperture control to manual aperture control, and user-friendliness is thus improved.

Figure 4:
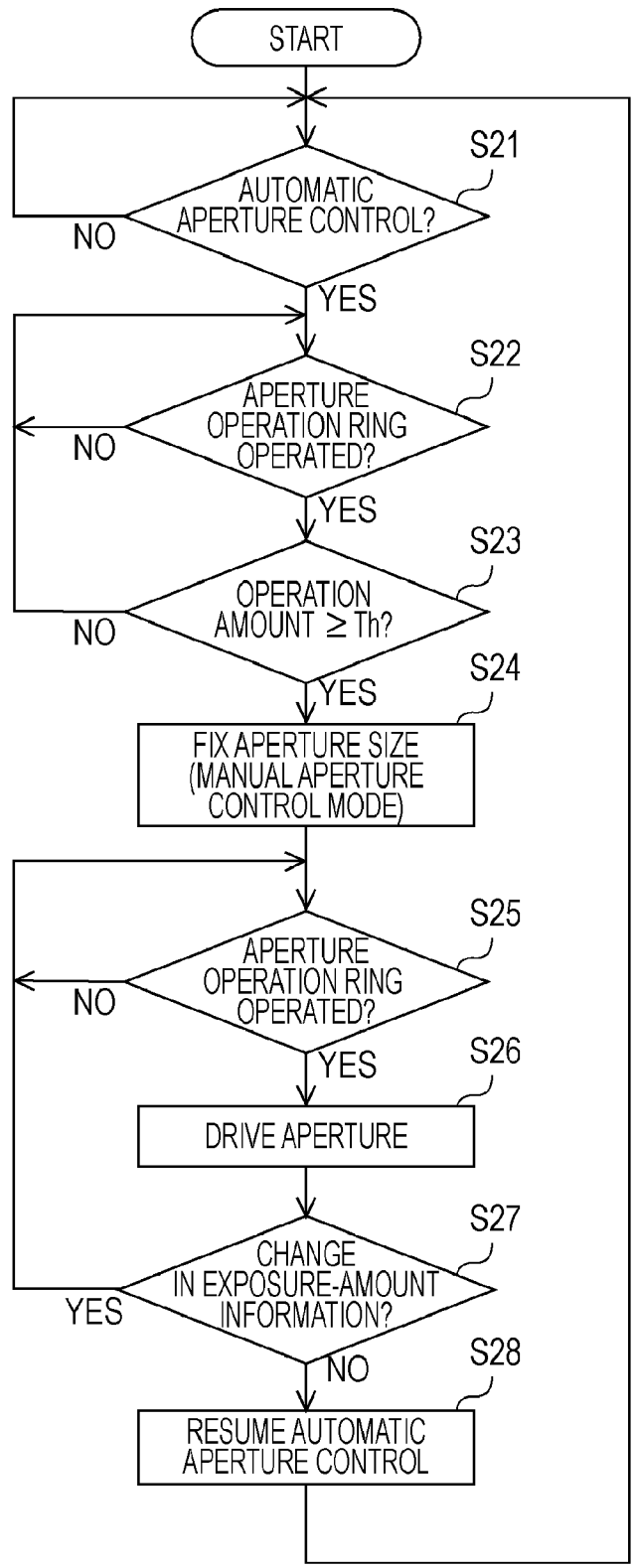
FIG. 4 is an example flowchart of operation.

FIG. 4 is a flowchart of the operation in which automatic aperture control is resumed by monitoring exposure-amount information. Steps S21 to S26 are the same or similar to steps S11-S16 of FIG. 2, which have been described above.

In step S27, after automatic aperture control is changed to manual aperture control, the CPU 8 monitors exposure-amount information extracted by the video-signal processing circuit 7 from a video signal obtained by the image pickup element 6 and sent by the video-signal processing circuit 7 and determines whether there is a change in the amount of exposure. For example, if there is no change in the amount of exposure in a predetermined period of time, such as ten seconds, the flow proceeds to step S28. If there is a change in the amount of exposure, manual aperture control is continued.

Figure 5:
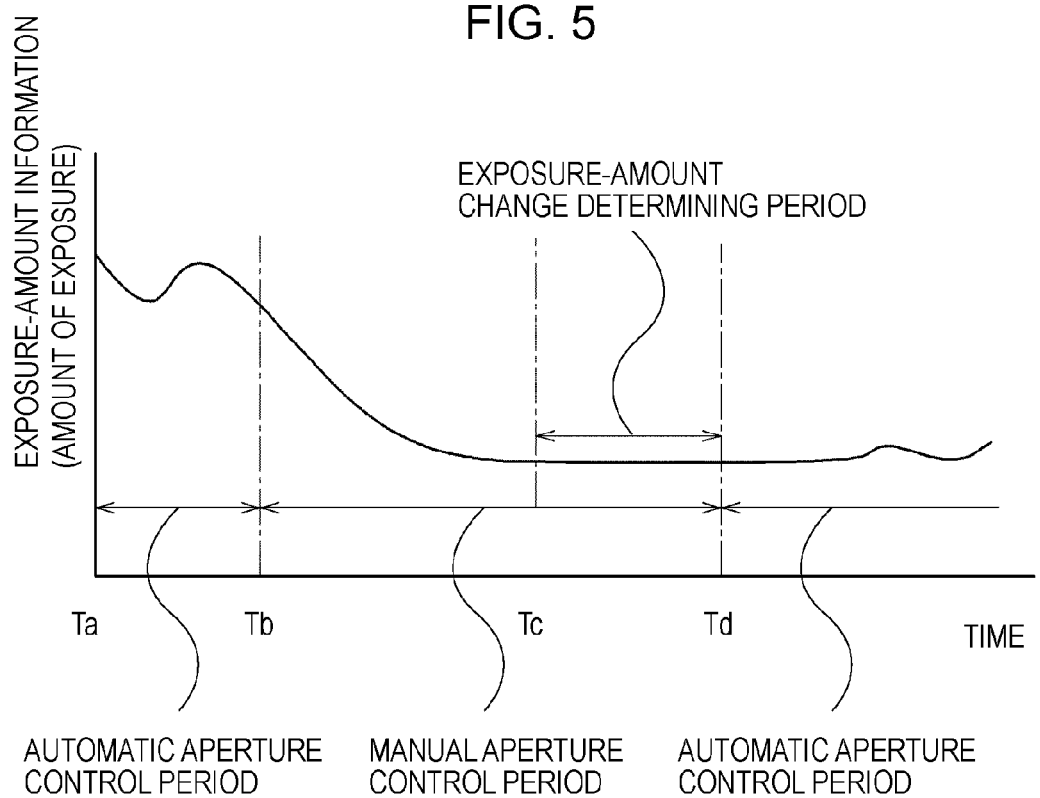
FIG. 5 is a graph illustrating exposure-amount information.

FIG. 5 illustrates the amount of exposure that changes with time. A period from Ta to Tb is an automatic aperture control period. At time Tb, as in steps S13 and S14 of FIG. 2, automatic aperture control is switched to manual aperture control. Thus, manual aperture control is performed in a period from Tb to Td. In a period from Tc to Td, it can be regarded that there is no change in the amount of exposure. That is, in step S27, the photographer has ended operating the aperture operation ring 9.

In step S28, automatic aperture control is resumed from time Td onward.

Furthermore, the amount the aperture operation ring 9 is operated can also be detected. If there is no change in the amount of exposure and if the aperture operation ring 9 is not operated, automatic aperture control can be resumed. In this way, automatic aperture control can be resumed in an excellent manner without being affected by the luminance of the object being photographed.

Accordingly, automatic aperture control can be easily switched by the photographer to manual aperture control and vice versa. The image pickup apparatus becomes easier to use and able to cope with a sudden change in the quantity of light.

Second Exemplary Embodiment

Figure 6:
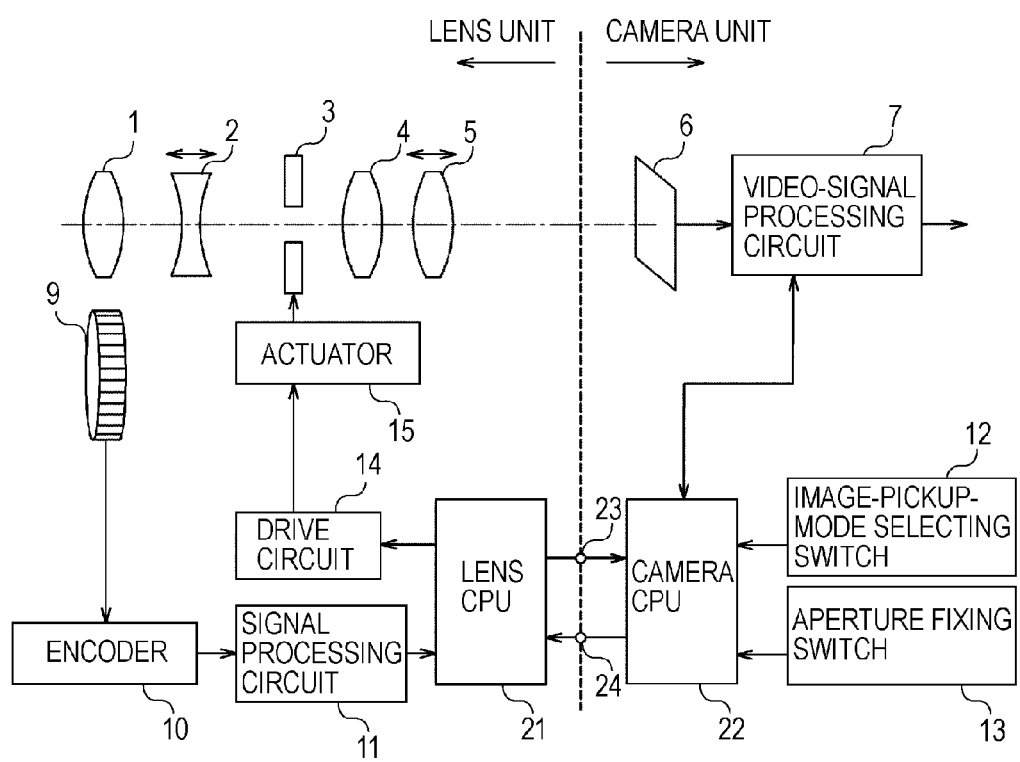
FIG. 6 is a block diagram of an example circuit according to a second embodiment of the present invention.

FIG. 6 is a circuit block diagram of an image pickup apparatus with a replaceable lens according to a second embodiment. The same reference numerals as those in the first embodiment shown in FIG. 1 denote the same or similar members. In the second embodiment, a lens unit is replaceable from a camera unit, which is a main body of the image pickup apparatus.

The lens groups 1, 2, 4, and 5 and the aperture 3 are provided in the lens unit, and the image pickup element 6 is provided in the camera unit. The CPU 8 of the first embodiment is separated into a lens CPU 21 in the lens unit and a camera CPU 22 in the camera unit. The signal processing circuit 11 and the drive circuit 14 are connected to the lens CPU 21. An output of the video-signal processing circuit 7 is connected to the camera CPU 22. An output of the image-pickup-mode selecting switch 12 and an output of the aperture fixing switch 13 are connected to the camera CPU 22. Information from the lens CPU 21 to the camera CPU 22 is sent through a communication line 23. Information from the camera CPU 22 to the lens CPU 21 is sent through a communication line 24.

The camera CPU 22 obtains exposure-amount information from the video-signal processing circuit 7 and sends the obtained exposure-amount information to the lens CPU 21 through the communication line 24. Based on the obtained exposure-amount information, the lens CPU 21 sends a drive signal to the drive circuit 14 so that the aperture 3 can have a desired aperture size. The lens CPU 21 sends various pieces of control information, such as an aperture fixing request, to the camera CPU 22 through the communication line 23. Any communication method, such as a clock synchronization method, a start-stop synchronization method, or a wireless communication method, can be used here.

Figure 7:
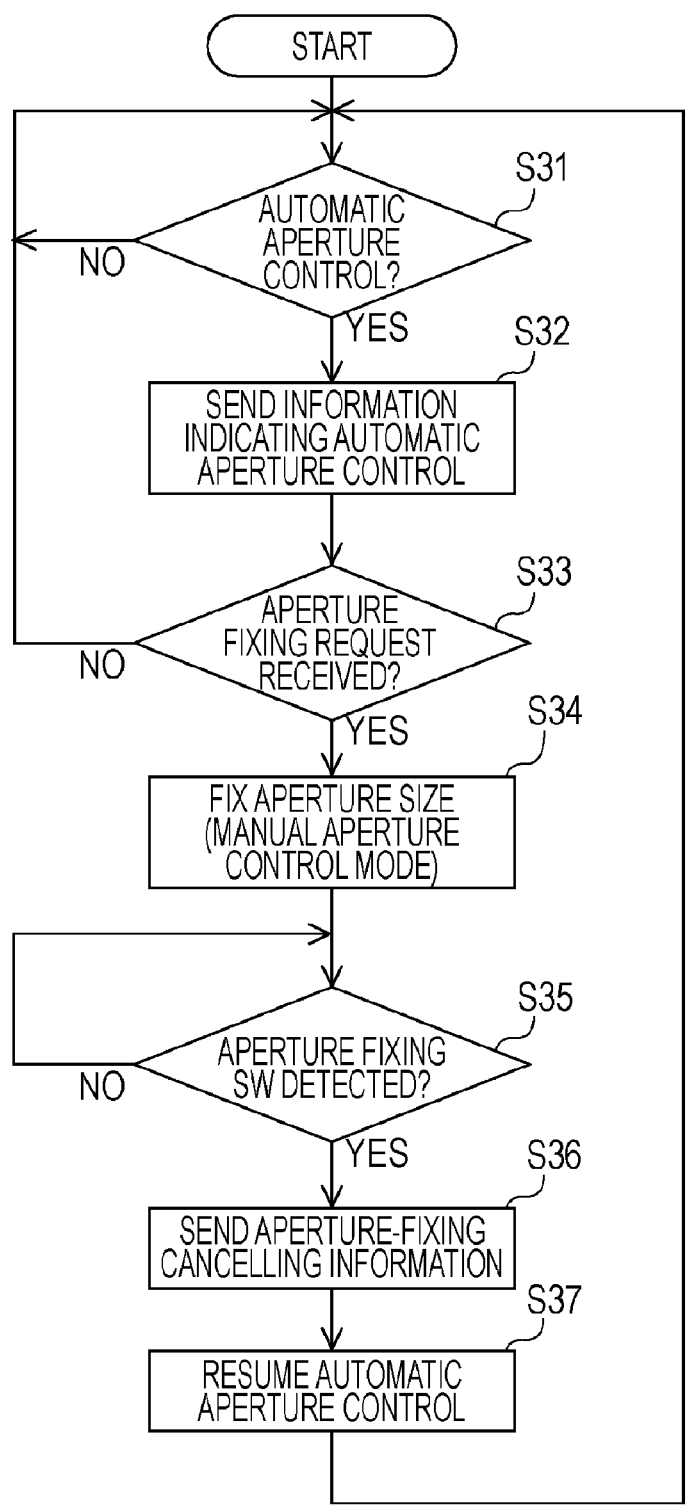
FIG. 7 is an example flowchart of operation.

FIG. 7 is a flowchart of the operation performed by the camera CPU 22.

In step S31, the camera CPU 22 determines whether aperture control is automatic aperture control or not. When automatic aperture control is currently performed, the flow proceeds to step S32.

In step S32, the camera CPU 22 sends status information indicating that automatic aperture control is currently performed to the lens CPU 21.

In step S33, the camera CPU 22 determines whether an aperture fixing request is received from the lens CPU 21. When no aperture fixing request is received, the flow returns to step S31. When an aperture fixing request is received, the flow proceeds to step S34.

In step S34, automatic aperture control is switched to manual aperture control, and the aperture size is fixed. However, the actual aperture control is performed by the lens unit. Thus, the camera unit performs processing such as displaying the aperture size.

In step S35, the camera CPU 22 determines whether the aperture fixing switch 13 is operated. When the aperture fixing switch 13 is not operated, step S34 is repeated, and manual aperture control is performed. When the aperture fixing switch 13 is operated, the flow proceeds to step S36.

In step S36, the camera CPU 22 sends aperture-fixing cancelling information, that is, manual-aperture-control terminating information, to the lens CPU 21, and the flow proceeds to the next step.

In step S37, automatic aperture control is resumed. The camera CPU 22 repeats the foregoing series of steps and determines whether aperture control is automatic aperture control or manual aperture control.

Figure 8:
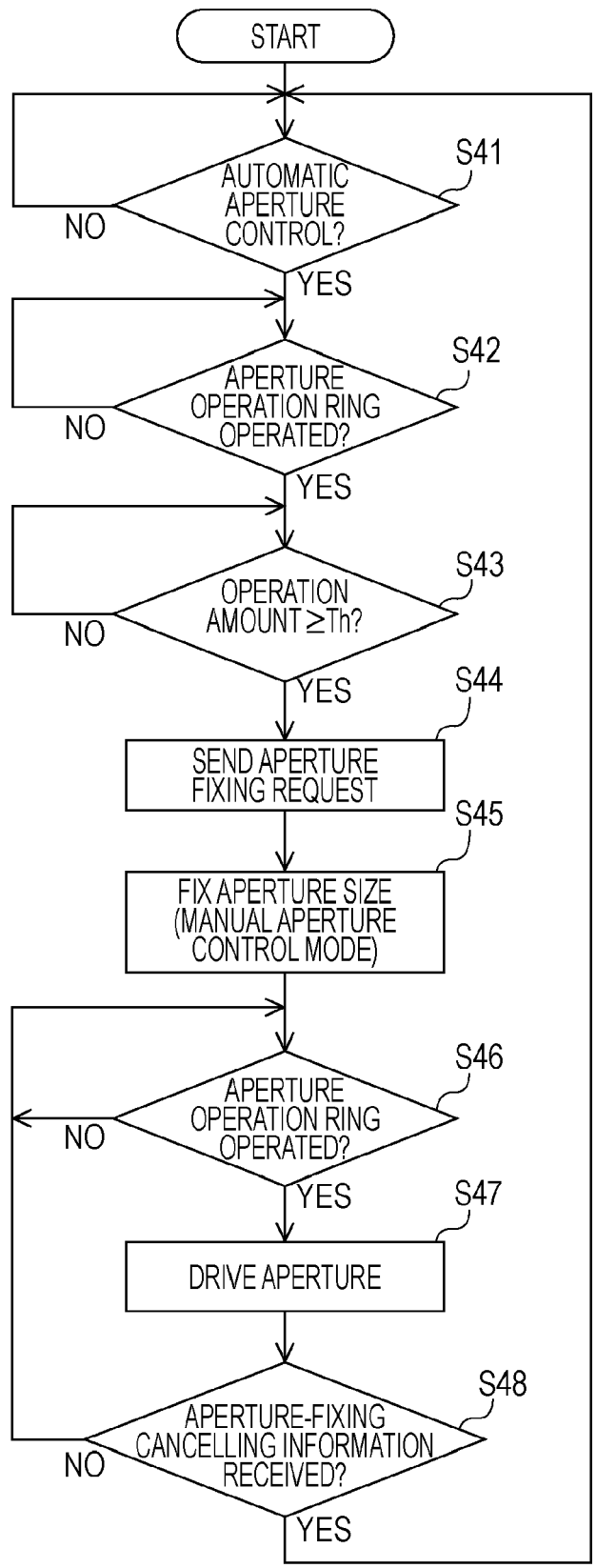
FIG. 8 is an example flowchart of operation.

FIG. 8 is a flowchart of the operation performed by the lens CPU 21.

In step S41, the lens CPU 21 receives the status information, which has been sent in step S32 of FIG. 7 described above, and determines whether automatic aperture control is currently performed. When automatic aperture control is currently performed, the flow proceeds to step S42.

In step S42, the flow waits for the aperture operation ring 9 to be operated. When the aperture operation ring 9 is operated, the flow proceeds to step S43.

In step S43, whether the amount operated in step S42 is greater than or equal to the threshold Th is determined. When the amount operated is greater than or equal to the threshold Th, the flow proceeds to step S44.

In step S44, the lens CPU 21 sends an aperture fixing request, that is, a request to change automatic aperture control to manual aperture control, to the camera CPU 22 through the communication line 23.

In step S45, automatic aperture control is changed to manual aperture control, and the aperture size is fixed. The aperture size to be fixed is preferably the aperture size that has been set at the end of automatic aperture control in order to avoid an extreme change in the amount of exposure. To fix the aperture size, the lens CPU 21 causes the drive circuit 14 to output a drive signal to drive the actuator 15.

In step S46, it is determined whether the aperture operation ring 9 is operated again. When the operation of the aperture operation ring 9 is detected, the flow proceeds to step S47.

In step S47, the aperture 3 is driven based on the amount the aperture operation ring 9 is operated.

In step S48, whether aperture-fixing cancelling information is received from the camera CPU 22 is determined. When aperture-fixing cancelling information is received, the flow returns to step S41 in order to resume automatic aperture control. When no aperture-fixing cancelling information is received, the flow returns to step S46, and manual aperture control is continued.

Figure 9:
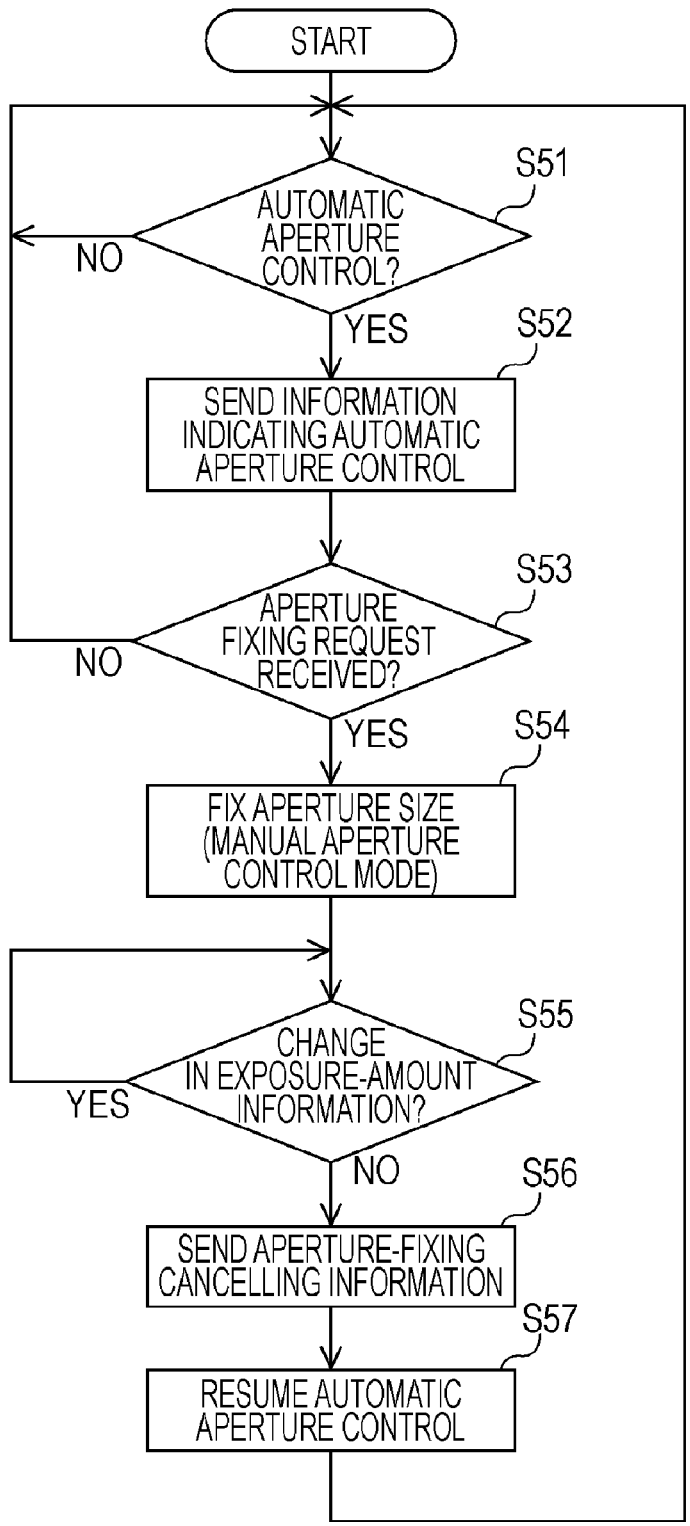
FIG. 9 is an example flowchart of operation.

FIG. 9 is a flowchart of the operation in which automatic aperture control is resumed by monitoring exposure-amount information. Steps S51 to S54 are the same or similar to steps S31 to S34 of FIG. 7, which have been described above.

In step S55, after automatic aperture control is changed to manual aperture control, the camera CPU 22 monitors exposure-amount information sent from the video-signal processing circuit 7 and determines whether there is a change in the amount of exposure. If there is no change in the amount of exposure, the flow proceeds to step S56. If there is a change in the amount of exposure, the camera CPU 22 does not perform aperture-fixing cancelling communication since manual aperture control is continued.

In step S56, if there is no change in the amount of exposure for a predetermined period of time, such as ten seconds, that is, if it is determined that the photographer has ended the manual aperture control operation, aperture-fixing cancelling information, that is, manual-aperture-control terminating information, is sent to the lens CPU 21, and the flow proceeds to the next step.

In step S57, automatic aperture control is resumed.

When the lens CPU 21 and the camera CPU 22 perform the respective operations described above, the photographer can easily change from automatic aperture control to manual aperture control and vice versa. The image pickup apparatus becomes easier to use.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-128872 filed May 15, 2007, which is hereby incorporated by reference herein in its entirety.

What is claimed is:

1. An optical apparatus comprising:
an image pickup element configured to convert a received optical image into an electrical signal;
an aperture unit configured to restrict a quantity of light incident on the image pickup element;
a manual aperture operation unit configured to give an instruction indicating that the aperture unit is manually driven by a photographer;
an aperture control unit configured to automatically control the aperture unit in accordance with the electrical signal output from the image pickup element or to control driving of the aperture unit according to an operation of the manual aperture operation unit; and
an operation-amount detector configured to detect an amount the manual aperture operation unit is operated,
wherein, in a case where the aperture unit is automatically driven, when the operation-amount detector detects that the manual aperture operation unit is operated by an amount greater than or equal to a predetermined amount, the aperture control unit disables automatic aperture control and enables manual aperture control of the aperture unit.

2. The optical apparatus according to claim 1, further comprising an aperture fixing switch configured to disable automatic control of the aperture unit in accordance with the electrical signal,
wherein, in a case where the aperture fixing switch is operated, the aperture control unit disables control of the aperture unit in accordance with the electrical signal and enables manual control of the aperture unit using the manual aperture operation unit.

3. The optical apparatus according to claim 2, wherein the aperture control unit enables automatic control of the aperture unit when the aperture fixing switch is operated in a case where manual control of the aperture unit using the manual aperture operation unit is performed.

4. The optical apparatus according to claim 1, further comprising a monitoring unit configured to monitor a signal relating to the electrical signal,
wherein automatic control of the aperture unit is enabled in a case where the monitoring unit monitors within a predetermined period that there is no change in the signal relating to the electrical signal.

5. The optical apparatus according to claim 1, further comprising:
an image-pickup-apparatus main body including the image pickup element; and
a lens unit including the aperture unit and the manual aperture operation unit, the lens unit being mounted on the image-pickup-apparatus main body in a replaceable manner,
wherein, in a case where the aperture unit is automatically controlled, when the operation-amount detector detects that the manual aperture operation unit is operated by an amount greater than or equal to the predetermined amount, the aperture control unit disables automatic aperture control and enables manual aperture control of the aperture unit.

6. The optical apparatus according to claim 5, wherein the image-pickup-apparatus main body includes the aperture fixing switch.

* * * * *